US011428353B2

(12) United States Patent
Ramirez

(10) Patent No.: US 11,428,353 B2
(45) Date of Patent: Aug. 30, 2022

(54) PIPE FLANGE ALIGNMENT AND LEVELING PINS

(71) Applicant: Jose Ramirez, West Jordan, UT (US)

(72) Inventor: Jose Ramirez, West Jordan, UT (US)

( * ) Notice: Subject to any disclaimer, the term of this patent is extended or adjusted under 35 U.S.C. 154(b) by 78 days.

(21) Appl. No.: 16/782,675

(22) Filed: Feb. 5, 2020

(65) Prior Publication Data

US 2021/0239244 A1 Aug. 5, 2021

(51) Int. Cl.
*F16L 23/00* (2006.01)
*B23K 37/053* (2006.01)

(52) U.S. Cl.
CPC ........ *F16L 23/003* (2013.01); *B23K 37/0533* (2013.01)

(58) Field of Classification Search
CPC .............. B23K 37/053; B23K 37/0533; B23K 37/0536; G01B 3/56; G01B 3/30; G01C 2009/187; G01C 9/28; F16L 37/004; F16L 23/003
See application file for complete search history.

(56) References Cited

U.S. PATENT DOCUMENTS

| | | | | |
|---|---|---|---|---|
| 2,358,564 A * | 9/1944 | Donaldson | ............... | G01B 3/56 33/387 |
| 2,531,799 A * | 11/1950 | Zumwalt | ................. | G01C 9/24 248/201 |
| 2,767,677 A * | 10/1956 | Johnson | ............. | B23K 37/0536 269/48.1 |
| 3,762,068 A * | 10/1973 | Clay | ........................ | G01C 9/24 33/529 |
| 3,822,481 A * | 7/1974 | Doan | ........................ | G01C 9/24 33/371 |
| 3,913,819 A * | 10/1975 | Hirose | ............... | B23K 37/0536 228/4.1 |
| 4,133,115 A * | 1/1979 | Stockholm | ............... | G01C 9/28 33/371 |
| 4,335,523 A * | 6/1982 | Bryant | ..................... | G01C 9/28 33/371 |

OTHER PUBLICATIONS

Flange Wizard, Inc. Magnetic Two Hole Pins*NEW* 2017 [online] [retrieved on Aug. 28, 2021] Retrieved from the Internet: https://flangewizard.com/magnetic-two-hole-pins-new/ (Year: 2017).*
Magnetic Two Hole Pins (Flange Wizard Inc.) youTube demonstration video Dec. 28, 2017 [online] [retrieved on Aug. 28, 2021] Retrived from the Internet: https://www.youtube.com/watch?v=mi17RrhpcHY (Year: 2017).*

* cited by examiner

*Primary Examiner* — David Bochna
(74) *Attorney, Agent, or Firm* — Lyman Moulton, Esq.; Moulton Patents, PLLC

(57) ABSTRACT

Pipe flange alignment leveling pins are disclosed to square a flange. The pins include a first and a second cylindrical magnet each configured to have a hollow axis and a positive radial pole and a negative radial pole. A first and a second chamfered hollow pin are engineered to axially receive a respective cylindrical magnet, the chamfer of each pin on an end configured complementary to a flange hole chamfer. A non-magnetic core is engineered to axially slide in and out of the hollow axis of the magnets received into respective pins wherein each of a pair of apparatus resemble a bow tie in cross section configured to align a pair of flanges in two places for a level operation. A level is set across a first and a second assembly of chamfered pins to determine a level flange ready for welding.

19 Claims, 7 Drawing Sheets

Cross Section

Magnet Holder Cross Section

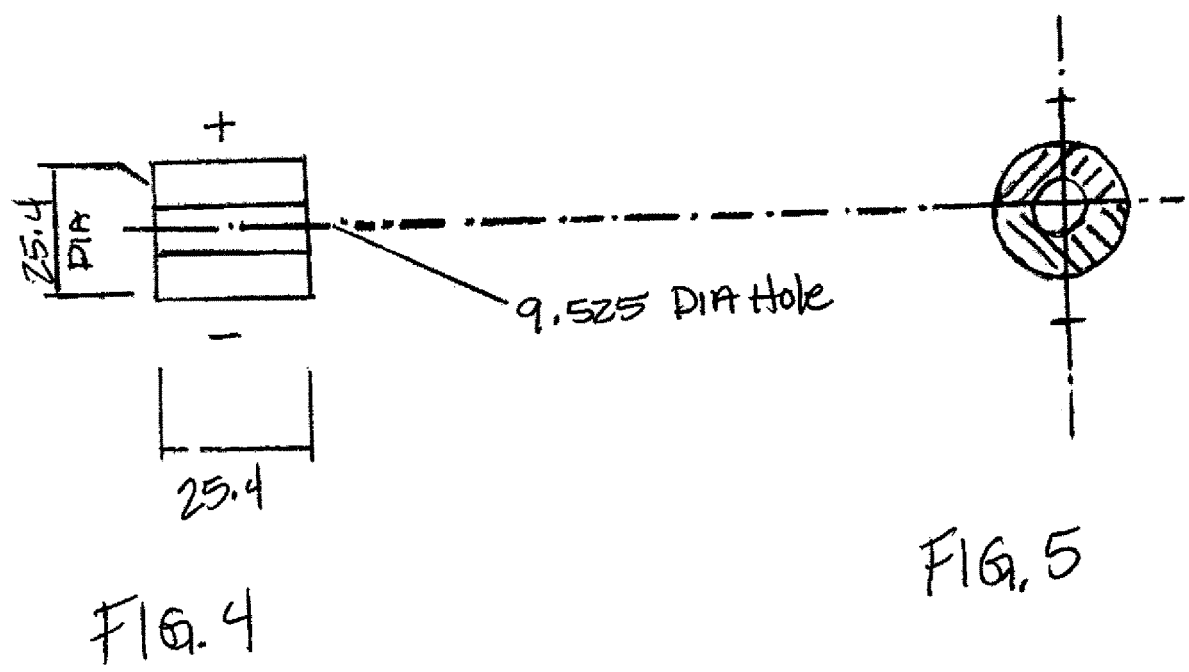

3/8" (9.525mm) ROD
Stainless steel

Magnets Rotated with polarities to attract each other provide clamping action

PIPE FLANGE ALIGNMENT AND LEVELING PINS

BACKGROUND OF THE INVENTION

Conventional tools available to a pipe fitter are two dimensional and therefore present problems to three dimensional pipe fitting. For instance, a conventional "L" shaped square may slide off the crest of a pipe where it is put by a fitter during squaring of a fitting to a section of pipe and render a squaring in accurate. Furthermore, the pipe fitter may not even be aware that his square has slide off the pipe crest and rendered his fitting inaccurate.

A small degree of offset in any of three dimensions in a pipe fitting weld can put a destination end of the pipe inches and even feet off a desired target. For this reason alone it is crucial that a pipe fitter get as close as possible to a straight weld, an orthogonal weld and an angular weld according to specifications. However, a pipe fitter has limited tools at his disposal to fit and weld a pipe to straight, square and angular specifications.

When a pipe fitter welds a flange onto a pipe, it is essential he welds it straight and orthogonal to the pipe. Various methods and devices are used in an attempt to secure a flange orthogonal to a pipe or to make it level but these devices fall short of being quick, accurate and secure for tack welds until the permanent weld can be made.

SUMMARY OF THE INVENTION

Pipe flange alignment leveling pins are disclosed to square a flange. The pins include a first and a second cylindrical magnet each configured to have a hollow axis and a positive radial pole and a negative radial pole. A first and a second chamfered hollow pin are engineered to axially receive a respective cylindrical magnet, the chamfer of each pin on an end configured complementary to a flange hole chamfer. A non-magnetic core is engineered to axially slide in and out of the hollow axis of the magnets received into respective pins wherein each of a pair of apparatus resemble a bow tie in cross section configured to align a pair of flanges in two places for a level operation. A level is set across a first and a second assembly of chamfered pins to determine a level flange ready for welding.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 4 is a lateral cross section depiction of the magnet portion of a single pipe flange alignment leveling pin in accordance with an embodiment of the present disclosure.

FIG. 5 is an end cross section depiction of the magnet portion of a single pipe flange alignment leveling pin in accordance with an embodiment of the present disclosure

Figure 1:
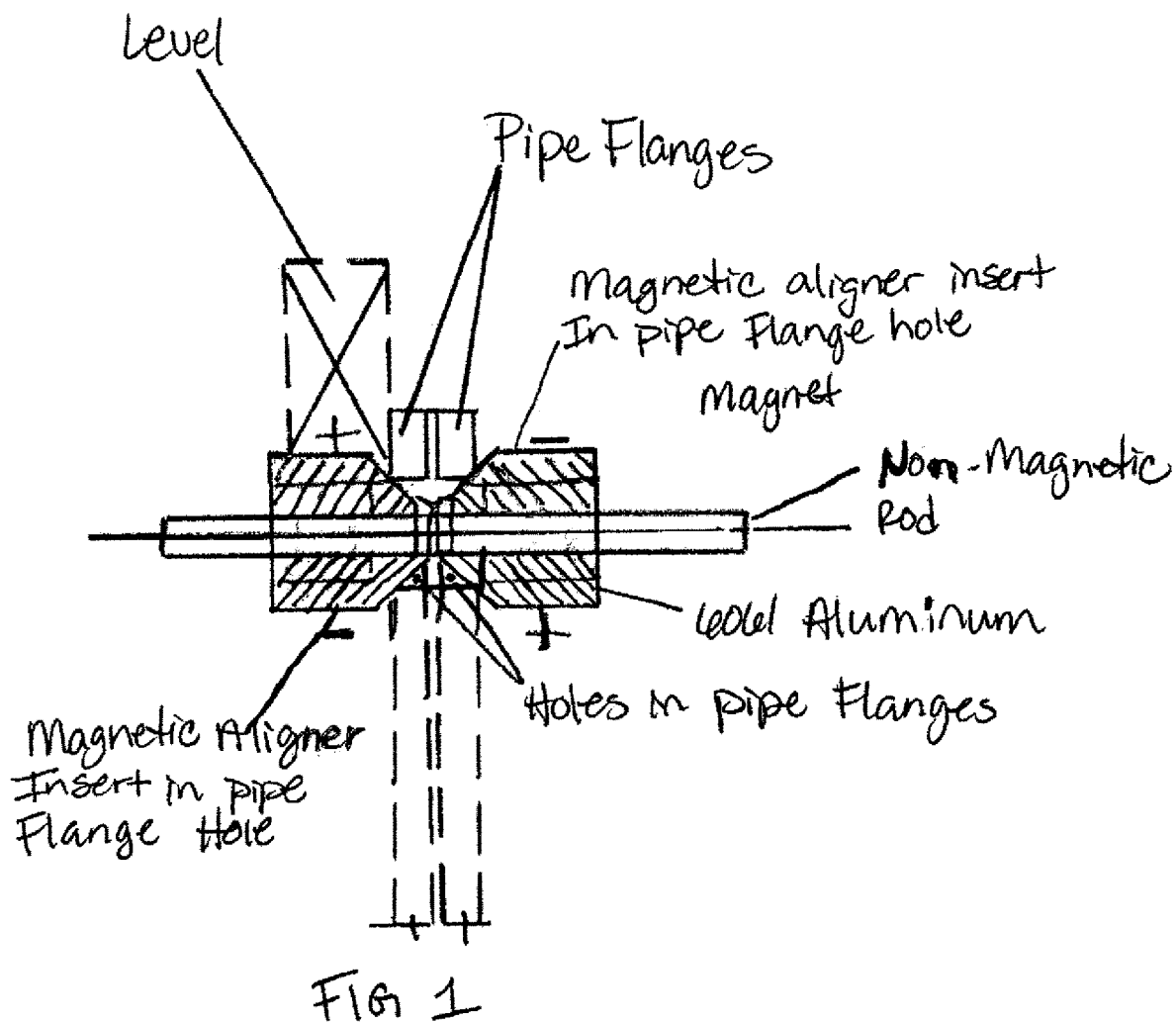
FIG. 1 is a cross section depiction of two pipe flange alignment leveling pins with a non-magnetic alignment rod in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

FIG. 1 is a cross section depiction of two pipe flange alignment leveling pins with a non-magnetic alignment rod in accordance with an embodiment of the present disclosure. The depiction includes a cylindrical magnet and an outer cylindrical magnet holder, both of which are concentric and hollow about the concentric axis. The magnet holder is made of aluminum or another non-magnetic material. The magnet is a rare earth highly magnetized material. The alignment rod is also a non-magnetic stainless steel or another non-magnetic material of high durometer. The alignment rods fit snugly into the concentric core of the magnet and magnet holder. The magnet holders are tapered to match a chamfer of the flange bolt holes.

Figure 2:
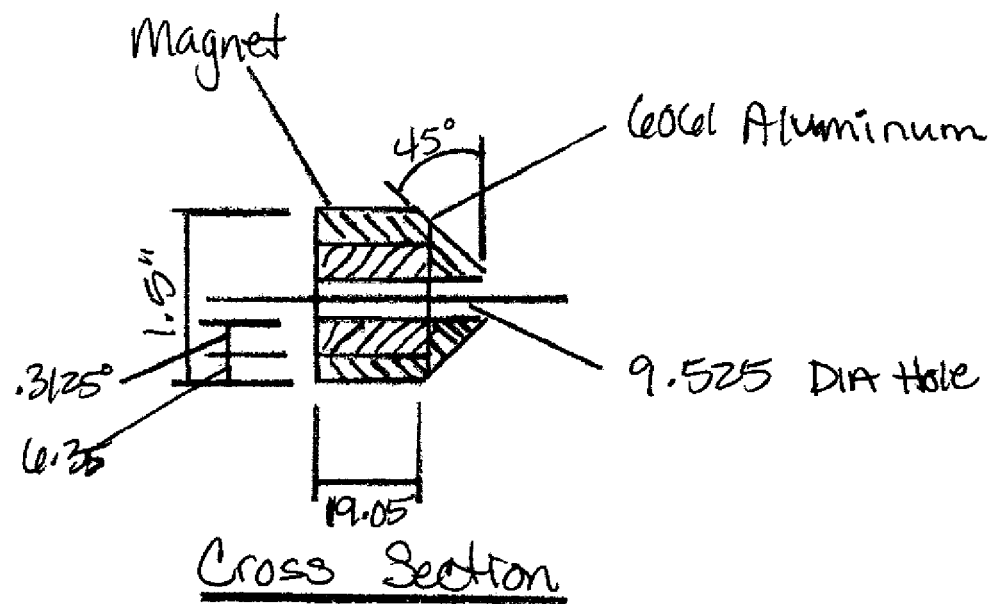
FIG. 2 is a depiction of a single pipe flange alignment leveling pin with magnet in accordance with an embodiment of the present disclosure.

FIG. 2 is a depiction of a single pipe flange alignment leveling pin with magnet in accordance with an embodiment of the present disclosure. The pipe flange alignment leveling pins are disclosed to square a flange. The pins include a first and a second cylindrical magnet each configured to have a hollow axis and a positive radial pole and a negative radial pole. A first and a second chamfered hollow pin are engineered to axially receive a respective cylindrical magnet, the chamfer of each pin on an end configured complementary to a flange hole chamfer. A non-magnetic core is engineered to axially slide in and out of the hollow axis of the magnets received into respective pins wherein each of a pair of apparatus resemble a bow tie in cross section configured to align a pair of flanges in two places for a level operation. A level is set across a first and a second assembly of chamfered pins to determine a level flange ready for welding.

Figure 3:
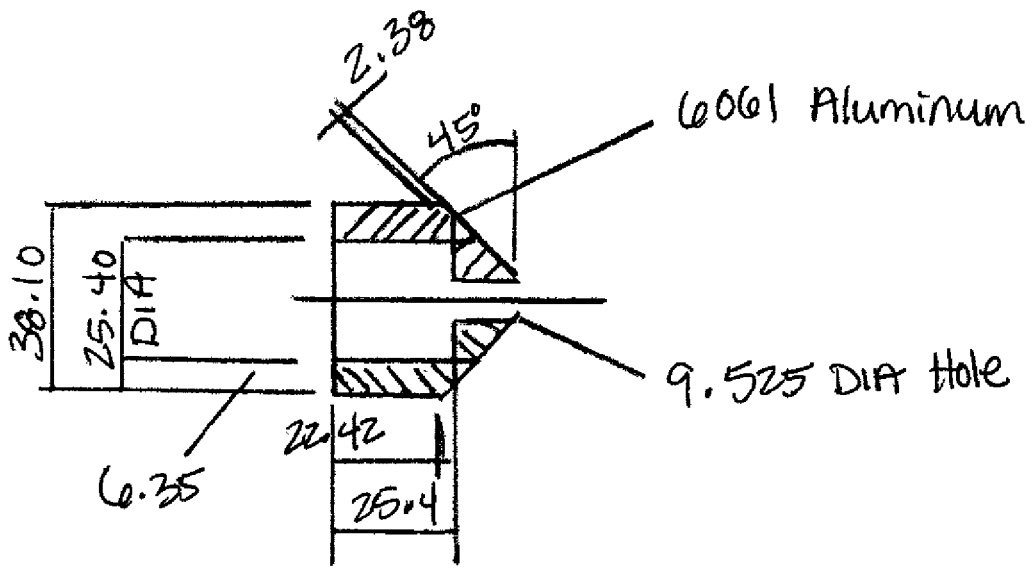
FIG. 3 is a depiction of a single pipe flange alignment leveling pin without magnet in accordance with an embodiment of the present disclosure.

FIG. 3 is a depiction of a single pipe flange alignment leveling pin without magnet in accordance with an embodiment of the present disclosure. The depiction includes a cylindrical magnet and an outer cylindrical magnet holder, both of which are concentric and hollow about the concentric axis and comprise a first leveling pin. The magnet holder is made of aluminum or another non-magnetic material. The magnet is a rare earth highly magnetized material. The magnet holders are tapered to match a chamfer of the flange bolt holes. The second leveling pin is the same as the first leveling pin. Multiple leveling pins may be used to set weld the flange to another flange.

FIG. 4 is a lateral cross section depiction of the magnet portion of a single pipe flange alignment leveling pin in accordance with an embodiment of the present disclosure. Note that the magnet is polarized about a half cylinder portion rather than from one end to another end. An inside diameter of the magnet is slightly larger than an outside diameter of the alignment pin for a snug fit of the two together.

FIG. 5 is an end cross section depiction of the magnet portion of a single pipe flange alignment leveling pin in accordance with an embodiment of the present disclosure. Note that the magnet is polarized about a half cylinder portion rather than from one end to another end.

Figure 6:
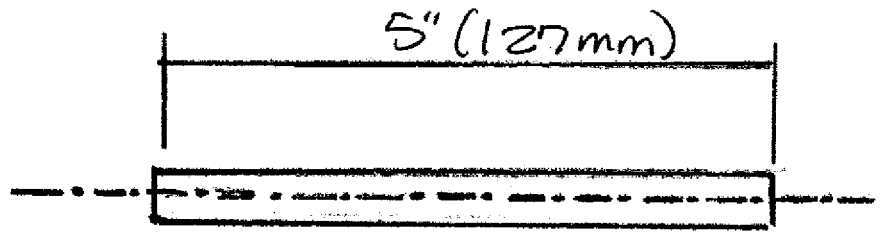
FIG. 6 is a lateral elevation view of a pipe flange alignment non-magnetic rod in accordance with an embodiment of the present disclosure.

FIG. 6 is a lateral elevation view of a pipe flange alignment non-magnetic rod in accordance with an embodiment of the present disclosure. The rod, also known as an alignment pin is non-magnetic is order to be inserted and removed without magnetic interference. The rod is shown in a three eights inch length but other lengths are used for larger pipe flange alignment bolt holes and various applications.

Figure 7:
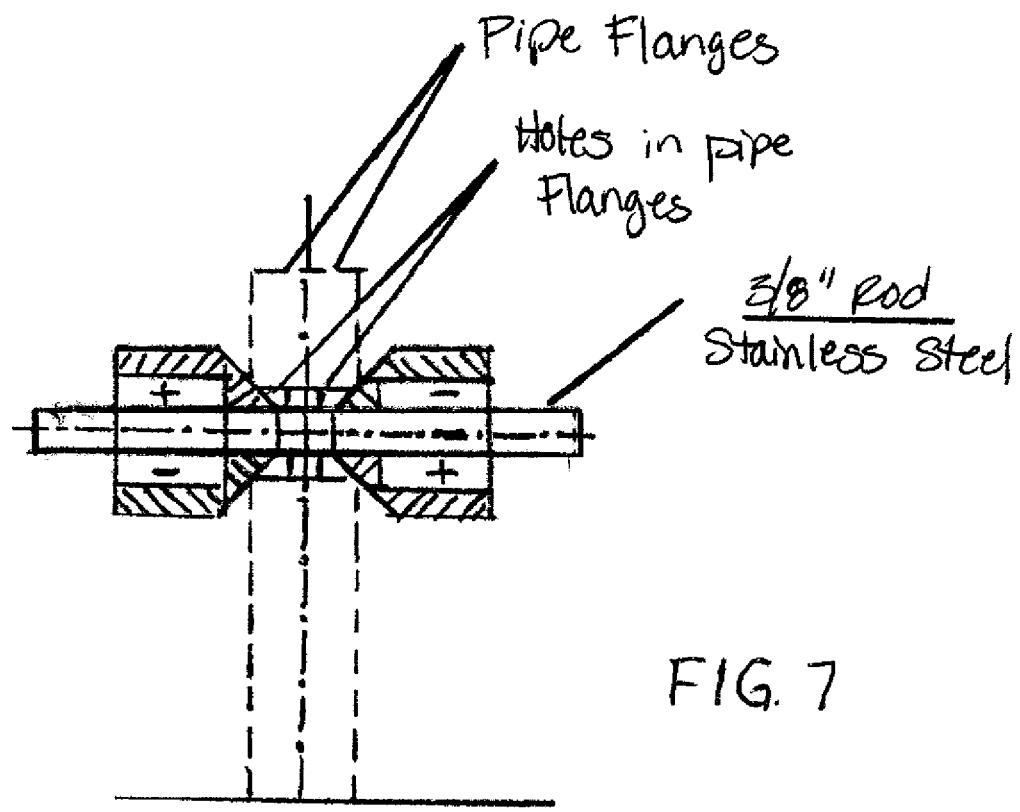
FIG. 7 is a cross section view of magnets lined up with opposite polarities in an attractive clamping action in accordance with an embodiment of the present disclosure.

FIG. 7 is a cross section view of magnets lined up with opposite polarities in an attractive clamping action in accordance with an embodiment of the present disclosure. When the magnets are rotated to line up opposite cylindrical polarities, the magnets attract each other and provide a clamping action across the two pins and the flanges.

Figure 8:
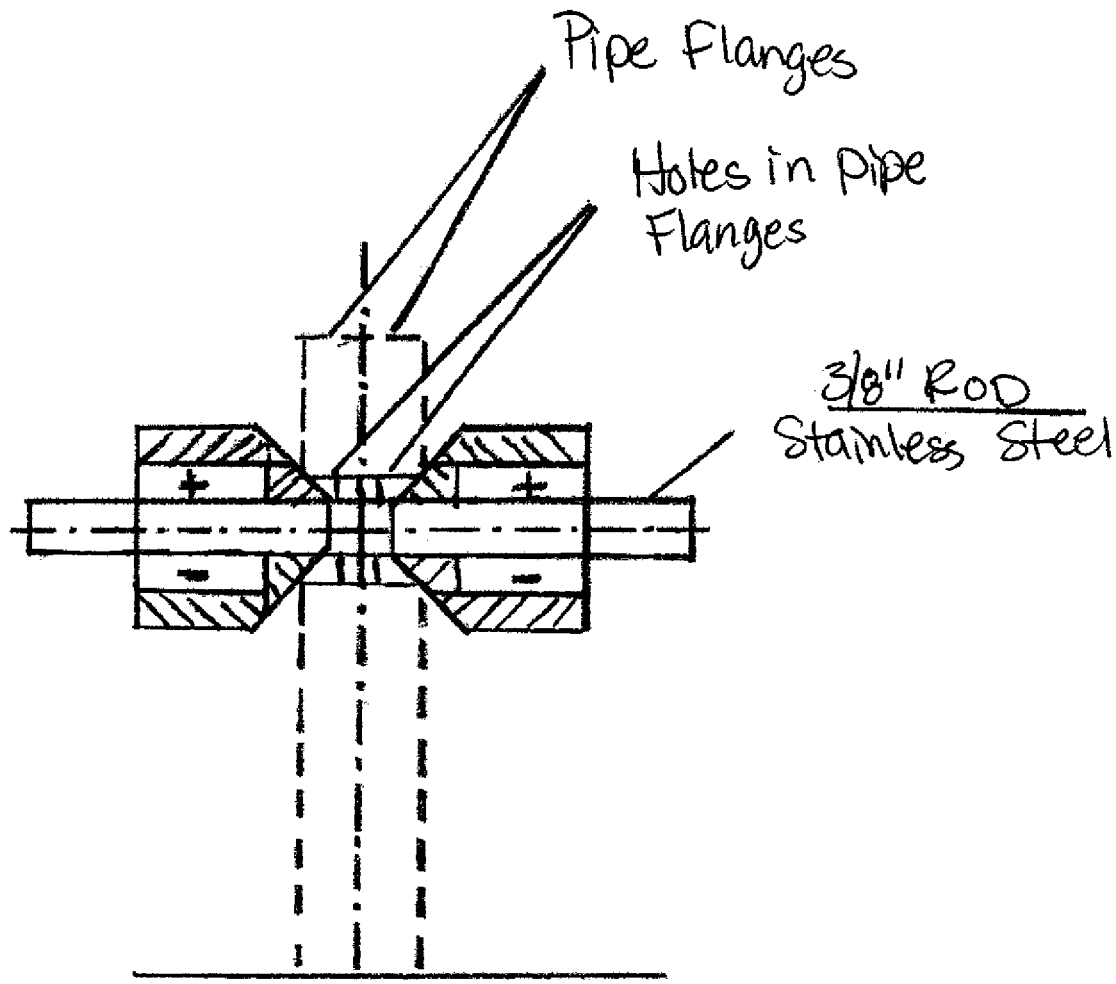
FIG. 8 is a cross section view of magnets rotated with same polarities in a repelling action for easy removal in accordance with an embodiment of the present disclosure.

FIG. 8 is a cross section view of magnets rotated with same polarities in a repelling action for easy removal in accordance with an embodiment of the present disclosure. When the magnets are rotated to line up with the same cylindrical polarities, the magnets repel each other and provide an easy removal of the pins from the flanges.

Figure 9:
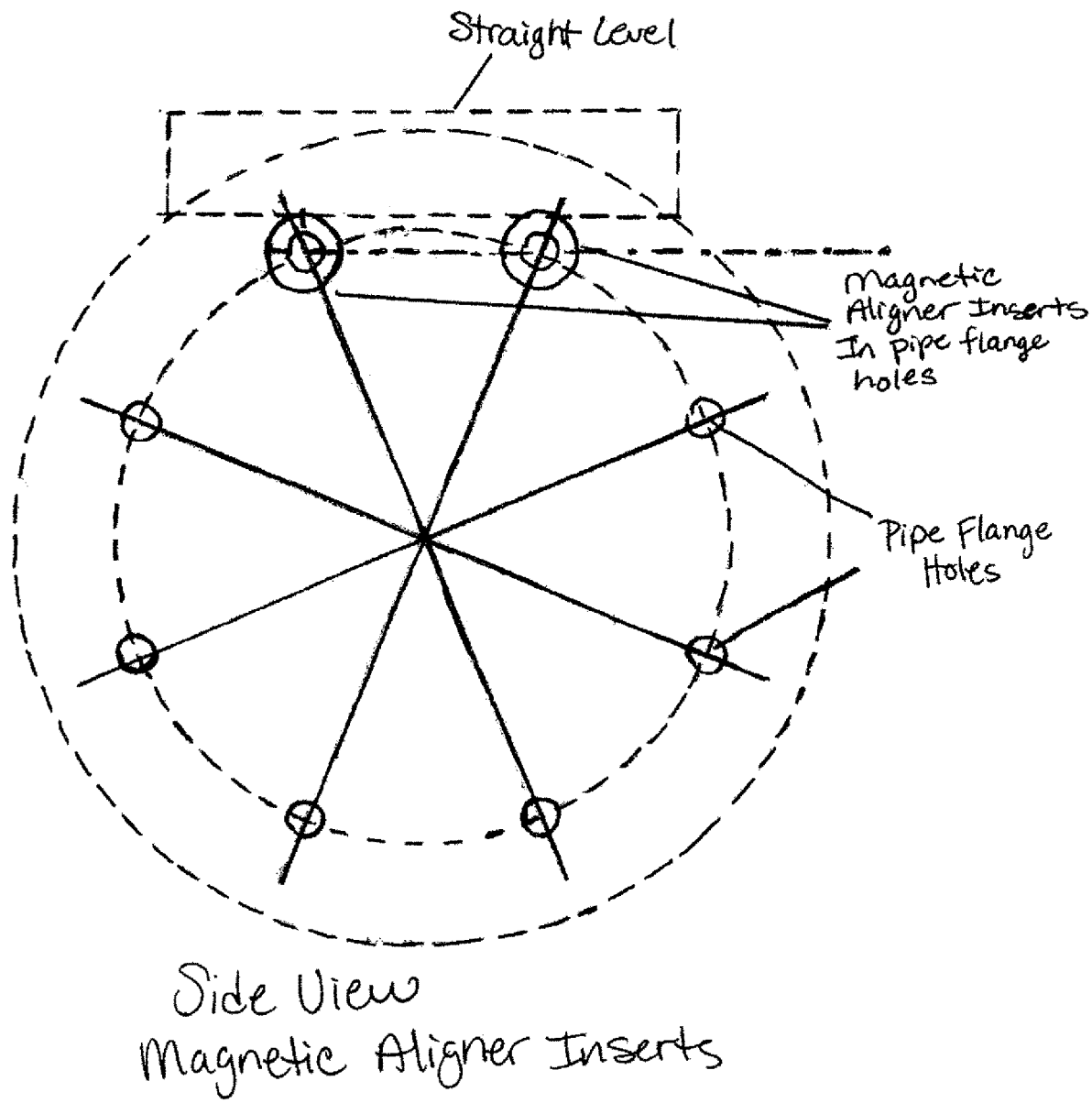
FIG. 9 is a front view of a pipe flange and two alignment leveling pins in accordance with an embodiment of the present disclosure.

FIG. 9 is a front view of a pipe flange and two alignment leveling pins in accordance with an embodiment of the present disclosure. The depiction includes a pipe flange as seen from a flange elevational end view. Eight pipe flange bolt holes are shown with two alignment pins inserted in the top two adjacent holes. A straight level is set atop the two pins to level the flange at which time a weld may be temporary or permanent fixing the two flanges adjacent each other.

Figure 10:
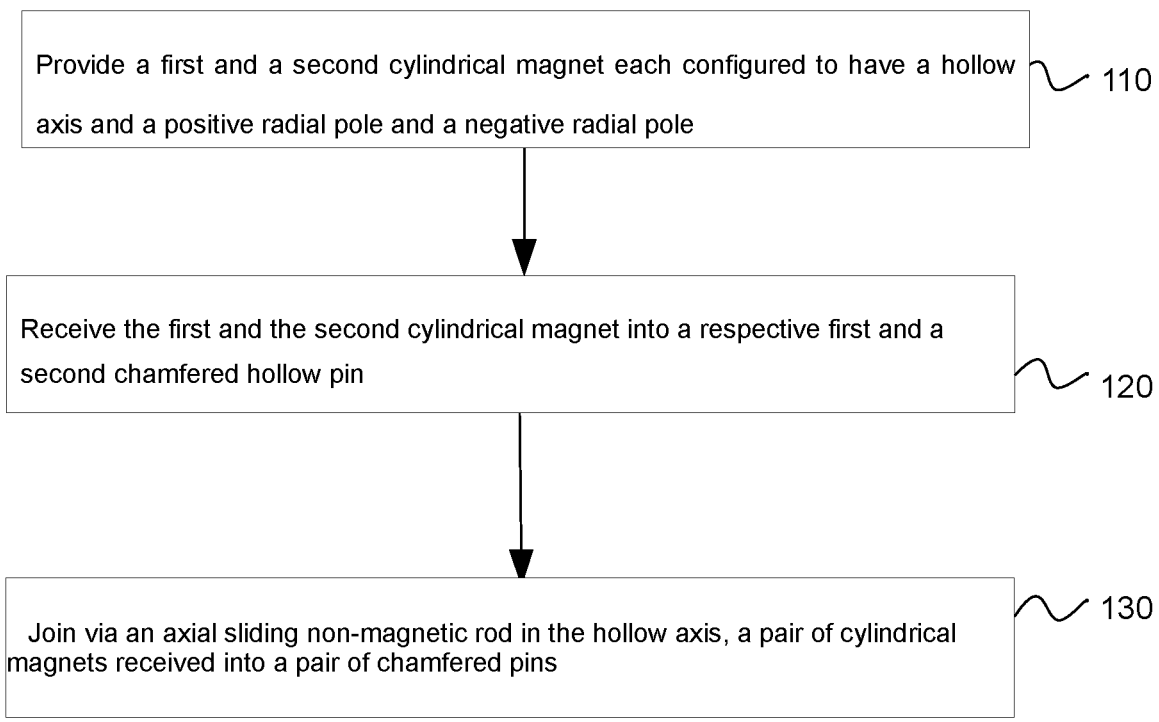
FIG. 10 is a flow diagram of a method for aligning a pipe flange via alignment leveling pins in accordance with an embodiment of the disclosure.

FIG. 10 is a flow diagram of a method for aligning a pipe flange via alignment leveling pins in accordance with an embodiment of the disclosure. The method includes providing 110 a first and a second cylindrical magnet each configured to have a hollow axis and a positive radial pole and a negative radial pole. The method additionally includes axially receiving 120 the first and the second cylindrical magnet into a respective first and a second chamfered hollow pin. The method further includes joining 130 via an axial sliding non-magnetic rod in the hollow axis, a pair of cylindrical magnets received into a pair of chamfered pins.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A pipe fitting squaring device, comprising:
    a first and a second cylindrical magnet each comprising a hollow axis and a positive radial pole and a negative radial pole;
    a first and a second chamfered hollow pin each comprising an axial hole therethrough a chamfered end to a non-chamfered end and to axially receive a respective cylindrical magnet wherein the first and the second chamfered hollow pin are identical; and
    a non-magnetic rod axially inserted into the hollow axis and join the first and the second cylindrical magnets received into the first and the second chamfered hollow pins and to protrude from both respective non-chamfered ends.

2. The squaring device of claim 1, wherein the chamfer of each hollow pin on the chamfered end is configured complementary to a pipe flange hole chamfer.

3. The squaring device of claim 1, wherein the first and the second cylindrical magnets and the first and the second hollow pins axially joined by the non-magnetic rod resemble a bow tie in cross section.

4. The squaring device of claim 1, wherein the first and the second cylindrical magnets and the first and the second hollow pins axially joined by the non-magnetic rod provide two points to determine a level flange for welding.

5. The squaring device of claim 1, further comprising a length of the non-magnetic rod configured to a 2 to 1 ratio of a combined length of two chamfered pins plus a width of two adjacent pipe flanges to a length of a single non-magnetic rod.

6. The squaring device of claim 1, wherein the non-magnetic rod comprises one of stainless steel, carbon fibers and various polymer compounds.

7. The squaring device of claim 1, wherein an alignment of opposite poles in an axially joined pair of magnets provides a clamping force there across.

8. The squaring device of claim 1, wherein an alignment of same polarity poles in an axially joined pair of magnets provides a removal force there across.

9. The squaring device of claim 1, wherein the first and the second axially joined cylindrical magnets and chamfered hollow pins provide first and a second points in a line for a level.

10. The squaring device of claim 1, wherein a pair of axially joined cylindrical magnets and chamfered pins provide a plane via two respective non-magnetic rods for a level.

11. A method for squaring a pipe fitting, the method comprising:
    providing a first and a second cylindrical magnet each comprising a hollow axis and a positive radial pole and a negative radial pole;
    axially receiving the first and the second cylindrical magnet into a respective first and a second chamfered hollow pin wherein the first and the second hollow pins are identical and define a radial hole there through a chamfered end to a non-chamfered end; and joining via an axial sliding non-magnetic rod in the hollow axis, the first and the second cylindrical magnets received into the first and the second chamfered hollow pins and protruding from both respective non-chamfered ends.

12. The method of claim 11, further comprising axially joining each of the first and the second cylindrical magnets and chamfered hollow pins by the non-magnetic rod to resemble a bow tie in cross section.

13. The method of claim 11, further comprising creating a first and a second point for a level flange welding via the first and the second cylindrical magnets and the first and the second chamfered hollow pins axially joined by the non-magnetic rod.

14. The method of claim 11, further comprising configuring a length of the non-magnetic rod to a 2 to 1 ratio of a combined length of two chamfered pins plus a width of two adjacent pipe flanges to the length of a single non-magnetic rod.

15. The method of claim 11, further comprising manufacturing the non-magnetic rod in stainless steel.

16. The method of claim 11, further comprising aligning opposite poles in an axially joined pair of magnets for a clamping force there across.

17. The method of claim 11, further comprising aligning same polarity poles in an axially joined pair of magnets provides a removal force there across.

18. The method of claim 11, further comprising generating a first and a second point in a line for a level weld via the first and the second axially joined cylindrical magnets and the first and the second chamfered hollow pins.

19. The method of claim 11, further comprising generating a plane for a level weld via two non-magnetic rods joining the first and the second axially joined cylindrical magnets and the first and the second chamfered hollow pins.

* * * * *